United States Patent
Rolf et al.

[11] Patent Number: 5,927,121
[45] Date of Patent: Jul. 27, 1999

[54] METHOD FOR THE MANUFACTURE OF A GEAR PART

[75] Inventors: Bernhard Rolf, Harsewinkel; Horst Zirnsak, Hamm, both of Germany

[73] Assignee: Leico Gmbh & Co. Werkzeugmaschinenbau, Ahlen, Germany

[21] Appl. No.: 09/008,300

[22] Filed: Jan. 16, 1998

[30] Foreign Application Priority Data

Jan. 17, 1997 [DE] Germany .................. 197 01 565.4

[51] Int. Cl.⁶ .................................................. B21H 05/00
[52] U.S. Cl. ................................ 72/68; 72/71; 72/110; 29/893.32
[58] Field of Search ................... 72/71, 68, 85, 72/110, 111; 29/892, 892.2, 892.3, 893.32, 894.324, 894.354

[56] References Cited

U.S. PATENT DOCUMENTS

| | | | |
|---|---|---|---|
| 4,824,422 | 4/1989 | Jocic | 29/892 |
| 4,936,129 | 6/1990 | Lipper et al. | 72/68 |
| 5,072,509 | 12/1991 | Bichel et al. | 72/111 |
| 5,806,358 | 9/1998 | Rolf | 72/68 |

FOREIGN PATENT DOCUMENTS

| | | | |
|---|---|---|---|
| DE 39 32 823 | 12/1990 | Germany . | |
| 61-132238 | 6/1986 | Japan | 29/892.2 |
| 2-117729 | 5/1990 | Japan | 29/892 |
| 2 153 278 | 8/1985 | United Kingdom | 72/85 |
| 0 552 776 | 7/1993 | United Kingdom | 29/892.3 |

*Primary Examiner*—Lowell A. Larson
*Attorney, Agent, or Firm*—Oblon, Spivak, McClelland, Maier & Neustadt, P.C.

[57] ABSTRACT

A method of manufacture of a gear part with a bottom area and a circumferential area, which has two portions. One portion extends to one side of the bottom area, while the other portion extends to the opposite side of the bottom area. On one portion is formed an inner profiling and on the other portion an outer profiling. According to a first method, on a cup-shaped preform a web is formed by splitting or flow-forming and extends in the opposite direction to the cup wall. In the thus formed web and in the cup wall are subsequently made the desired profilings. In a second method, an arcuate curl is produced and is subsquently flow-formed to the portions with the profilings.

12 Claims, 5 Drawing Sheets

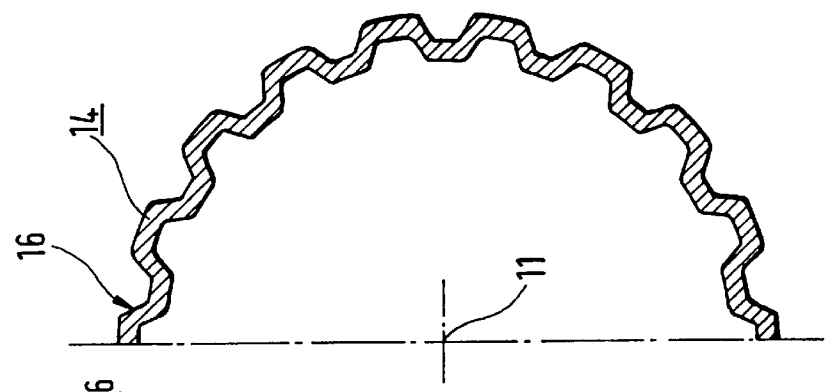
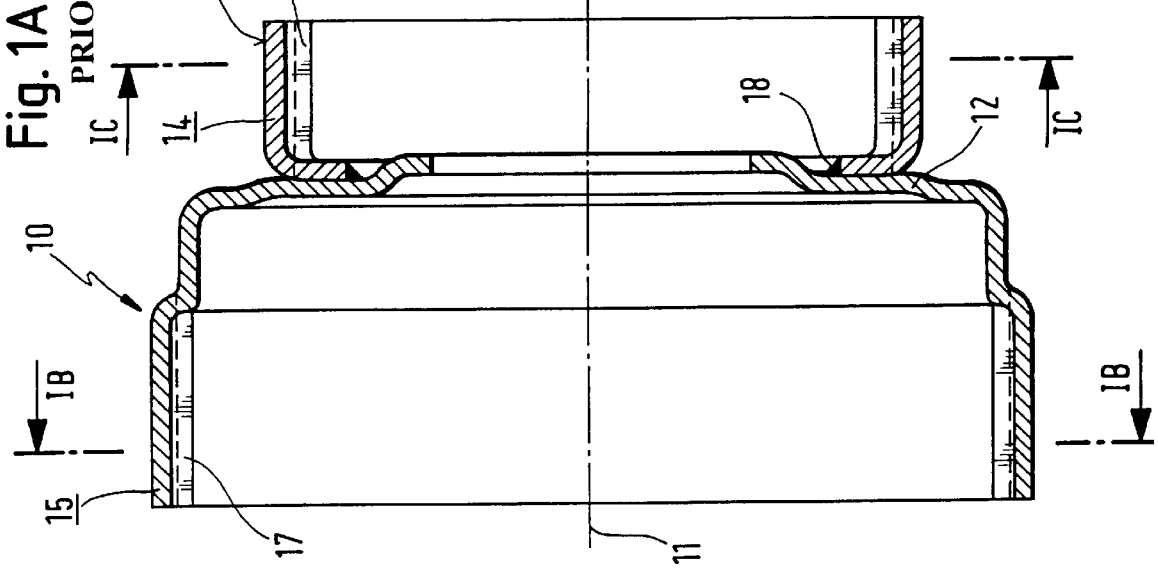
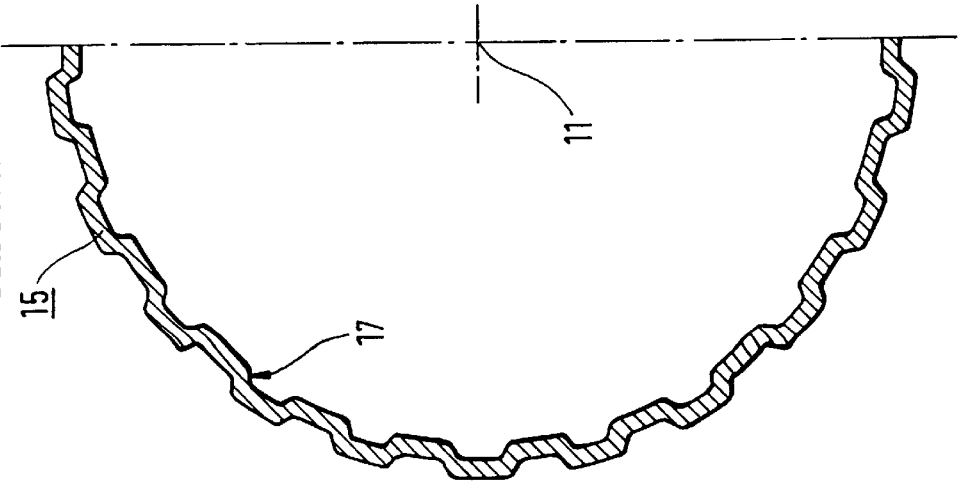

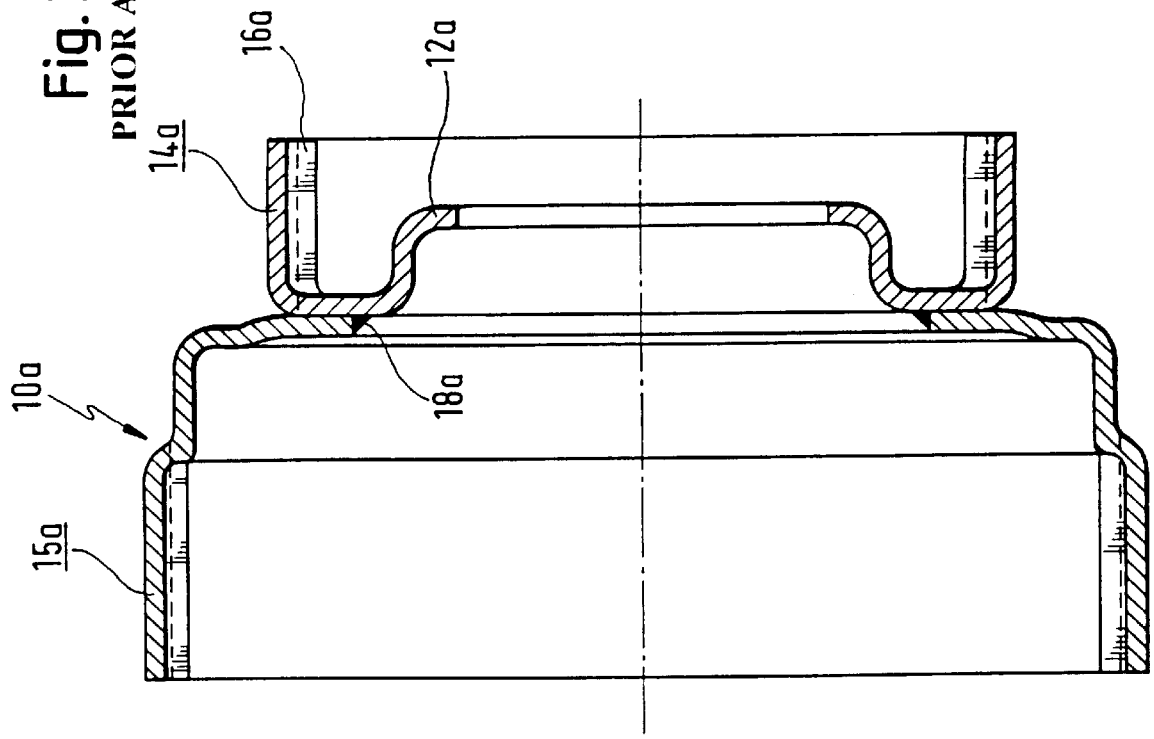

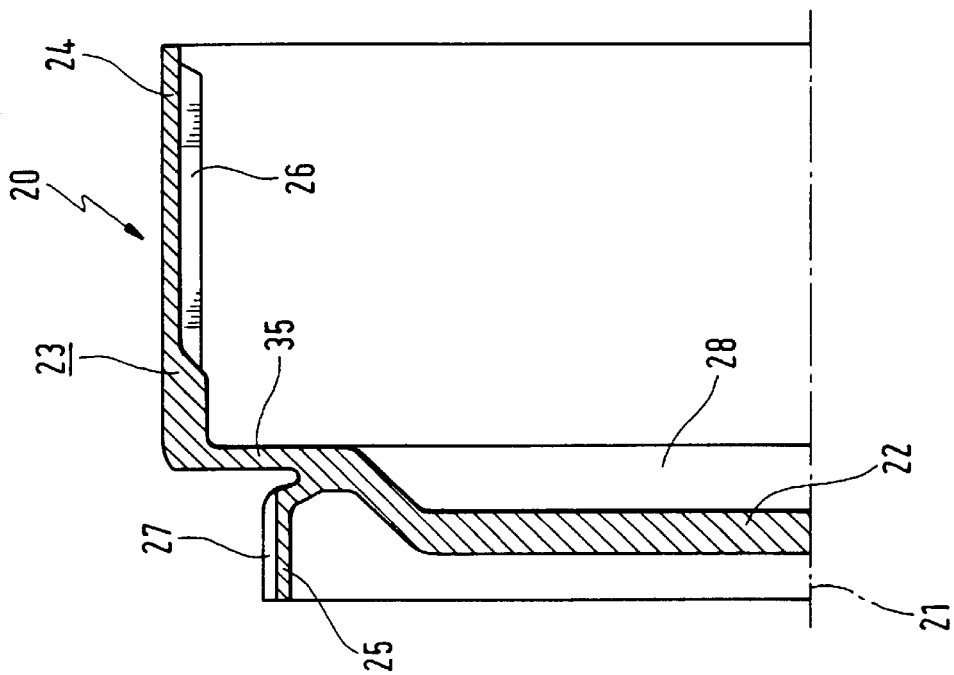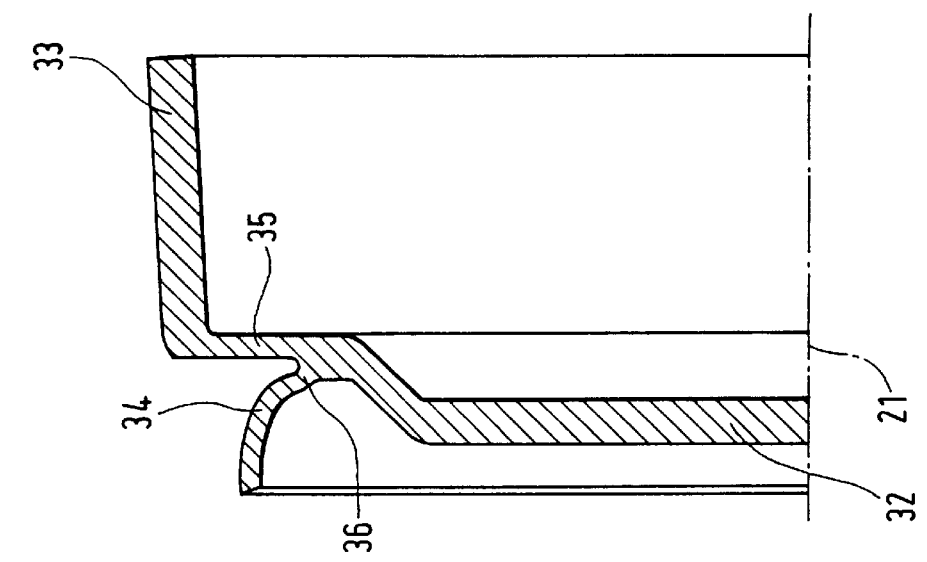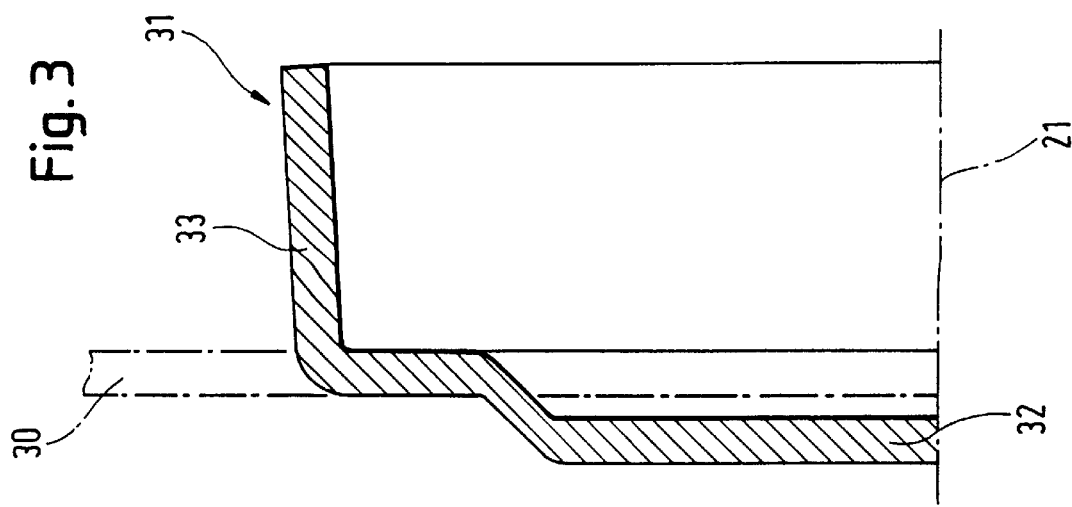

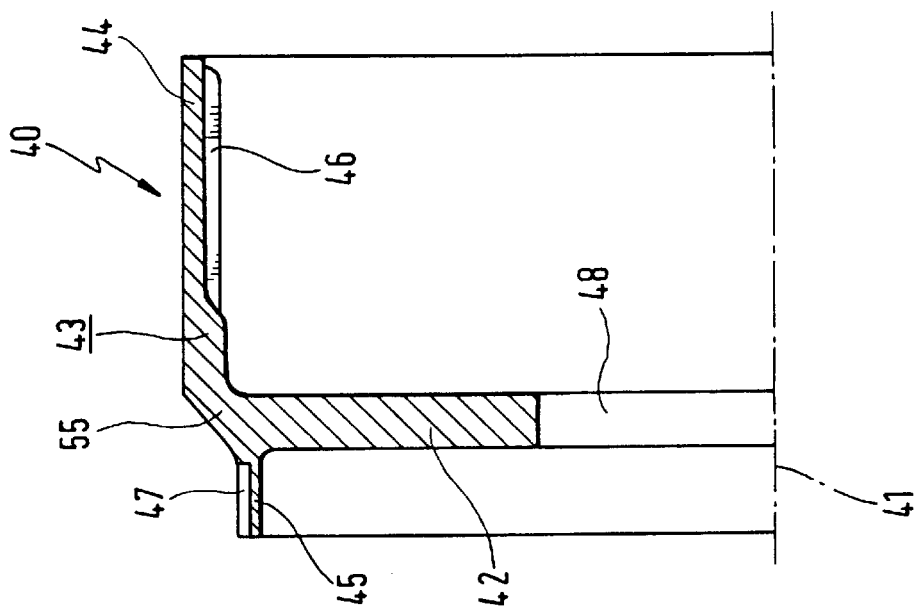
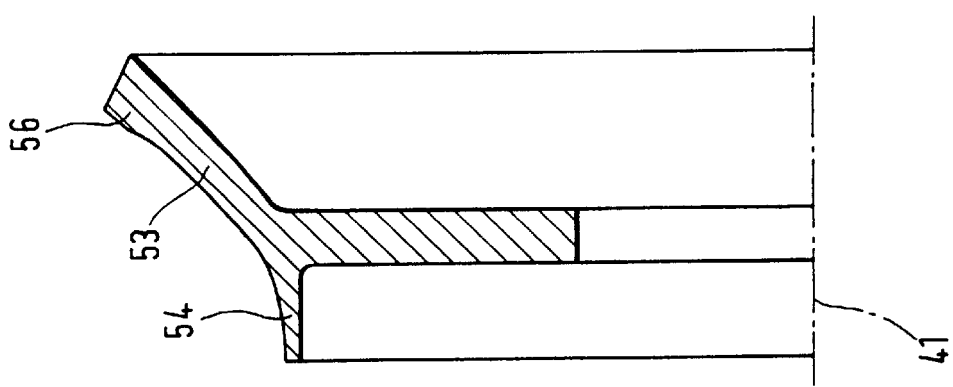
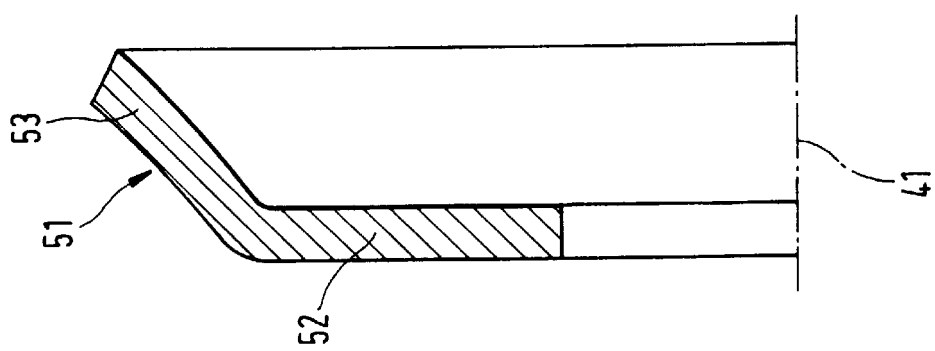
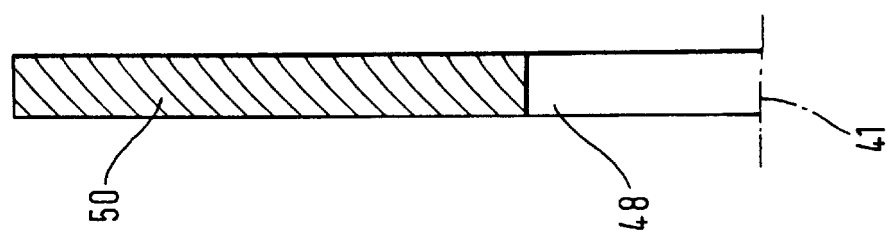

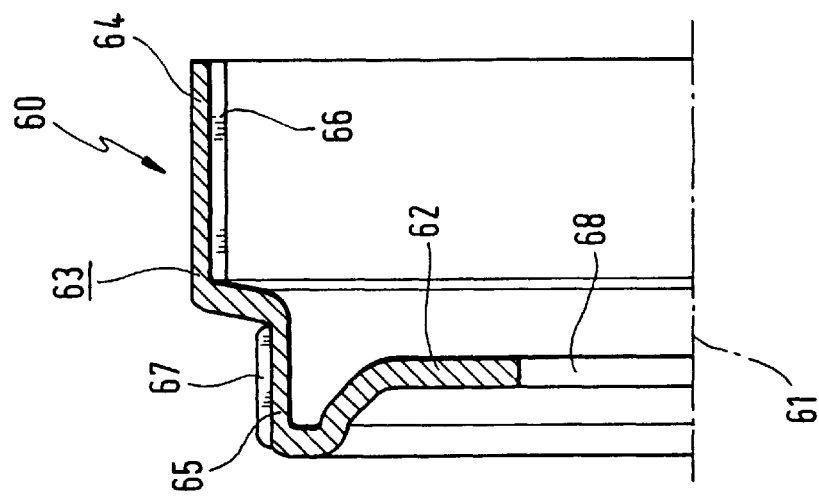
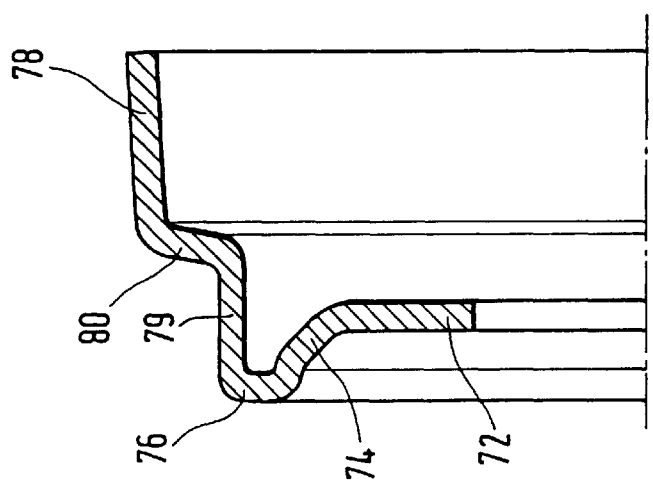
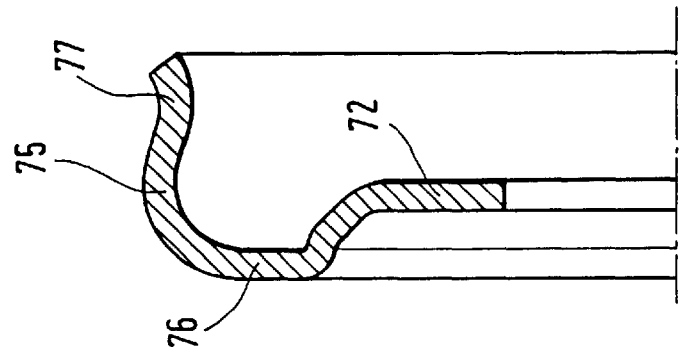
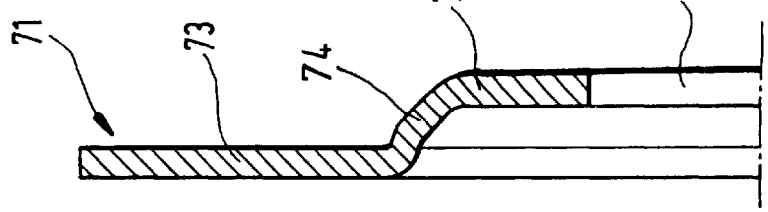

METHOD FOR THE MANUFACTURE OF A GEAR PART

BACKGROUND OF THE INVENTION

1. Field of the Invention

The invention relates to a method for the manufacture of a gear part with a substantially radially directed bottom area, a substantially axially directed circumferential area with two portions, whereof one portion extends to one side of the bottom area and the other portion to the opposite side of the bottom area, an inner profiling on one portion of the circumferential area and an outer profiling on the other portion of the circumferential area.

2. Description of the Related Art

Such gear parts are mainly used in car gears. The profilings are constructed as inner and outer tooth systems. For the manufacture of such gear parts, it is known to initially manufacture two cup-shaped pieces with in each case one toothed portion. These single pieces can be manufactured by machining with or without cutting, such as is e.g. described in DE-C-39 32 823.

The pieces are subsequently placed against one another with their base plates, oriented with respect to one another and then welded. Despite a relatively complicated orientation operation, there is a risk of thermal distortion occurring through the introduction of heat on welding.

SUMMARY OF THE INVENTION

The object of the invention is to provide a method with which it is possible to manufacture said gear part in an geometrically accurate and at the same time inexpensive manner.

This object is achieved by a method having the features of claim 1.

The method according to the invention comprises the method steps:

forming a circular sheet metal blank to a cup-shaped preform with a bottom and an annular wall, forming an annular web, which extends from the bottom to the side, which is remote from the annular wall, rolling and final forming of the annular wall to a profiled portion of the circumferential area and flow-forming and final forming of the annular web to the other profiled portion of the circumferential area.

This method ensures the manufacture of the gear part from one piece. A complicated orientation and welding of the pieces is unnecessary. This leads to a simplification of manufacture and to a high dimensional accuracy of the finished products.

According to an embodiment of the invention, the forming of the annular web takes place by splitting the bottom. Splitting is carried out by means of at least one splitting roller, which is infed radially to the outer circumference of the bottom with the workpiece rotating. Through a corresponding shaping of the splitting roller, the annular web can be formed in a simple manner.

During splitting the wall thickness of the bottom is reduced. If such a wall thickness reduction is not desired, according to an alternative, inventive method variant, the flow-forming of the annular web takes place by flow-forming the outside of the annular wall. A flow-forming roller is infed and passes over the outside of the rotating annular wall from its free end to the bottom. During free flowing the wall thickness of the annular wall decreases and the removed material is displaced to the opposite side of the bottom for forming the annular web.

With a view to a short manufacturing time, it is advantageous for the forming of the circular sheet metal blank, the flow-forming of the web and the flow-forming operation to take place in one setting on a flow-forming machine. The flow-forming machine can in particular be a so-called flow-forming center, which in particularly flexible manner can perform the most varied forming operations.

The object is also achieved by an inventive method, which as the method steps:

forming a depression in a central area of a circular sheet metal blank, the depression forming the bottom area of the gear part, bending round an outer edge of the circular sheet metal blank to the side to which the depression curves and flow-forming and final forming of the bent, outer edge to the two profiled portions of the circumferential area.

This method according to the invention also enables the gear part to be manufactured in one piece, so that once again the advantages of easy manufacture and high dimensional accuracy are achieved.

A preferred embodiment of the invention comprises performing the bending round of the outer edge by curling using a curling roller with the circular sheet metal blank rotating. The curling roller has an outer contour corresponding to the contour of the desired bending of the outer blank edge.

Alternatively, the formation of the depression and the bending round of the outer edge are performed simultaneously in a pressing step. The circular sheet metal blank is consequently so preformed on a deep-drawing press that only one flow-forming step has to be performed on the flow-forming machine.

According to the invention, both of the aforementioned methods are further developed in that the outer and/or inner profiling are constructed as involute teeth. The inner tooth system can consequently be used as an internal planet gear and the outer tooth system for a spur gear.

In order to extend the functions of the gear, according to the invention the outer or inner profiling are constructed as driving teeth for sets of laminations and are particularly used for coupling parts.

It is also preferred for the two portions to be radially, mutually displaced. The two portions are joined by a web, which runs radially or in sloping manner to the rotation axis of the gear part. The arrangement of the teeth on different diameters permits a particularly compact construction of the gear.

The manufacture of a hub on the gear part is achieved according to the invention in that a hole pattern and/or a profile is made in the bottom area in a pressing step.

It is particularly preferable for the pressing step to take place on fixing the circular sheet metal blank in the flow-forming machine. The pressing step, which can comprise a deep-drawing step and a punching step on a press, is brought about by the axial movement of the two tool halves, between which the circular sheet metal blank is fixed on a flow-forming machine. The gear part can consequently be completely machined on the flow-forming machine. In the sense of the present invention, the term circular sheet metal blank is also understood to mean a profiled starting workpiece, which is e.g. shaped by casting.

BRIEF DESCRIPTION OF THE DRAWINGS

The invention is described in greater detail hereinafter relative to non-limitative embodiments and the attached drawings, wherein show:

FIG. 1A is a cross-sectional taken view through a gear part according to the prior art.

FIG. 1B is a partial cross-sectional taken view along line A—A in FIG. 1A.

FIG. 1C is a partial cross-sectional view along line B—B in FIG. 1A.

FIG. 2 shows a further prior art gear part.

FIGS. 3 to 5 are cross-sectional views of through the manufacturing steps of a workpiece, which is manufactured according to an embodiment of the first inventive method to a gear part.

FIGS. 6 to 9 are cross-sectional views of the manufacturing steps of a workpiece, manufactured to a gear part according to a further embodiment of the first inventive method.

FIGS. 10 to 13 are partially cross-sectional views of the manufacturing steps of a workpiece, manufactured to a gear part according to the second inventive method.

DESCRIPTION OF THE PREFERRED EMBODIMENT

FIGS. 1A to 1C show in different views a gear part 10, manufactured according to a prior art method. The gear part 10 comprises two pieces 14, 15 constructed in cup-shaped manner. On their cup walls the pieces 14, 15 in each case have a profiling 16, 17, which is used as an outer and/or inner profile. Oriented with a common rotation axis 11, the two pieces 14, 15 are joined at their bottom plates with a weld 18, in order to form a bottom area 12 extending substantially radially to a circumferential area 13.

FIG. 2 shows a further gear part 10a, which is assembled in known manner from two pieces 14a, 15a by means of a weld 18a. In this gear part 10a the bottom area 12a is positioned radially below a profile 16a of the piece 14a.

An embodiment of the first inventive method can be gathered from FIGS. 3 to 5. The starting workpiece is a circular sheet metal blank 30, which is only diagrammatically intimated by a dot-dash line. On a press the circular sheet metal blank 30 is deep-drawn to a preform 31, which is rotationally symmetrical to the rotation axis 21. The preform 31 comprises an axially directed annular wall 33 and a profiled bottom 32, which already can have the final shape of a bottom area of the gear part to be manufactured. This workpiece contour can also be formed on a flow-forming machine, starting from a planar, circular sheet metal disk.

The preform 31 is subsequently clamped between two, (not shown) tool halves of a flow-forming machine. Subsequently a splitting roller is radially infed to the rotary preform 31 and splits the outer edge of the bottom 32. An annular web 34 is formed extending from the side of the bottom 32 remote from the annular wall 33 and projecting axially over the same. During the splitting process the annular wall 33 remains substantially unchanged. The bottom 32 is connected by a connecting web 35 with a bifurcation 36, as well as with the annular wall 33 and the split, annular web 34. The annular wall 33 and web 34 are axially and radially mutually displaced.

Subsequently the annular wall 33 is pressed by means of a flow-forming roller against a profiled, outer contour of the associated tool half, the annular wall 33 passing to a first portion 24 of a circumferential area 23 of the gear part 20 and is provided with an inner profile 26. Simultaneously the annular web 34 is pressed by means of a sprocket against the other tool half of the flow-forming machine and a second portion 25 of the circumferential area 23 is provided with an outer profile 27. Obviously the tool halves and rollers can also be so constructed that on the two portions 24, 25 in each case an inner and outer profile is formed, as shown in FIGS. 1B and 1C. During the following flow-forming the connecting web 35 and the profile 28 in the bottom area 22 remain unchanged. In one setting in a flow-forming center it is possible to carry out all the forming operations necessary in order to form the circular sheet metal blank 30 to the finished form 20.

A further embodiment of the first inventive method is shown in FIGS. 6 to 9. Here again the starting workpiece is constituted by a circular sheet metal blank 50 rotationally symmetrical to a rotation axis 41. In a preceding punching process a hole 48 is made in the central area of the blank 50.

The outer edge of the circular sheet metal blank 50 is bent or angled to one side, which can be performed in a deep-drawing press or on a flow-forming machine. A preform constructed in this way has a substantially radially directed bottom 52 and an annular wall 53 inclined thereto.

A flow-forming roller is radially infed to the annular wall 53 and passes over the outside of the latter from its free end to the bottom 52. A material volume is removed, which is displaced to the opposite side for forming an annular web 54. The infeeding of the flow-forming roller can take place in such a way that a material accumulation 56 remains at the free end of the annular wall 53.

Subsequently the flow-formed annular wall 53 undergoes flow-forming by means of a smooth flow-forming roller against an externally profiled tool half, so that a first portion 44 with an inner profiling 46 is produced on the circumferential area 43 of a gear part 40. In addition, the annular web 54 is pressed by means of a sprocket against a cylindrical tool half, so that on the other side of the bottom area 42 is produced a second portion 45 with an outer profiling 47. The first portion 44 and second portion 45 are mutually radially displaced and connected by a connecting web 55. In this method it is also possible to carry out all the forming operations in a single setting.

An embodiment of a further inventive method is illustrated in FIGS. 10 to 13. The starting workpiece is constituted by a preform 71, which is provided in its central area with a depression 72 having a hole 68 and a radially directed, outer edge 73. The depression 72 and outer edge 73 are interconnected by a sloping crossbar 74. The preform 71, which can be manufactured by deep-drawing, forging or casting, is clamped in the flow-forming machine and rotated. Through the radial infeeding of a curling roller with an arcuate outer contour, the outer edge 73 is formed to a curved curl 75. The curl 75 is directed to the side towards which the depression 72 curves, so that an undercut is formed between the crossbar 74 and the curl 75. In this embodiment curling takes place in such a way that an unshaped area 76 of the outer edge 73 remains and a material accumulation 77 is formed at the free edge of the curl 75.

In a further machining step on a flow-forming machine the curl 75 is formed into a stepped annular wall with a first, larger diameter annular area 78 and a second, smaller diameter annular area 79. The two annular areas 78, 79 are interconnected by a substantially radially directed connecting web 80. The bottom 72, crossbar 74 and unshaped area 76 remain unchanged during this and the following machining step.

Subsequently, for the formation of the gear part 60 a flow-forming roller is applied to the annular wall, which presses the first annular area 78 against a profiled outer contour of a tool half and consequently forms a first portion 64 with an inner profiling 66 on the circumferential area 63 of the gear part 60. In addition, by an externally toothed flow-forming roller the second annular area 79 is formed to the second portion 65 with an outer profiling 67 of the circumferential area 63 of the gear part 60. The outer profiling 67 is positioned radially above a bottom area 62 and extends to either side of the latter. The two portions 64, 65 of the circumferential area 63 are concentric to a rotational axis 61 of the gear part 60 and are radially, mutually displaced. As a result of the one-piece construction of the gear part 60, the latter can be easily manufactured and has a high strength. All the forming operations can take place in one setting on a flow-forming center.

Obviously, numerous modifications and variations of the present invention are possible in light of the above teachings. It is therefore to be understood that within the scope of the appended claims, the invention may be practiced otherwise than as specifically described herein.

What we claim is:

1. A method for the manufacture of a gear part with a substantially radially directed bottom area, a substantially axially directed circumferential area with two portions, wherein one of said portions extends to one side of the bottom area and the other portion to an opposite side of the bottom area and an inner profiling is provided on one portion of the circumferential area, which comprises:

forming a circular sheet metal blank to a cup-shaped preform with a bottom and an annular wall which includes tilting an outer edge portion of said annular blank to an intermediate position and forming a material accumulation at a free end portion of said annular wall, forming an annular web, which extends from the bottom to the side, which is remote from the annular wall, rolling and final forming of the annular wall to a profiled portion of the circumferential area and flow-forming and final forming said annular web to the outer profiled portion of the circumferential area such that said outer wall has one of an inner and outer profiling and said annular web has one of an inner and outer profiling.

2. The method according to claim 1, the forming of the annular web comprises splitting the bottom.

3. The method according to claim 1, wherein the forming of the annular web takes comprises flow-forming an outside portion of the annular wall.

4. The method according to claim 1, wherein the forming of the circular sheet metal blank, the forming of the web and the flow-forming are performed in one setting on a flow-forming machine.

5. A method for the manufacture of a gear part with a substantially radially directed bottom area, a substantially axially directed circumferential area with two portions, wherein one portion extends to one side of the bottom area and the other portion extends to an opposite side of the bottom area, an inner profiling being provided on one portion of the circumferential area and an outer profiling being provided on another portion of the circumferential area, which comprises:

forming a central depression and a hold in a central portion of a radial blank by exclusively deep-drawing said central depression;

curling a radially directed outer edge of the radial blank and forming a curl directed to a side towards which said depression curls so as to form a material accumulation at a free end portion of the curl;

flow-forming the curl into a stepped annular wall having first and second wall areas, each of said wall areas have a substantially constant wall thickness;

flow-forming and pressing said first wall area against a profiling outer contour of a tool and forming an inner profiling; and forming a toothed portion in said second wall area by using a flow-forming roller so as to form an outer profiling.

6. The method according to claim 5, wherein the curling takes place by using a curling roller and rotating the circular sheet metal blank.

7. The method according to claim 5, wherein the formation of the depression and the curling are performed simultaneously in a single pressing step.

8. The method according to claims 1 or 5, wherein the outer profiling and/or inner profiling comprise involute teeth.

9. The method according to claims 1 or 5, wherein the outer profiling and/or inner profiling comprise driving, teeth for forming sets of laminations.

10. The method according to claims 1 or 5, wherein the two portions are mutually, radially displaced.

11. The method according to claims 1 or 5, which comprises forming a hole and/or a profile in a bottom area in a single pressing step.

12. The method according to claim 11, wherein the pressing step takes place upon clamping of the circular sheet metal blank in the flow-forming machine.

* * * * *